US007584694B2

(12) United States Patent
Scharp

(10) Patent No.: US 7,584,694 B2
(45) Date of Patent: Sep. 8, 2009

(54) COMPOSITE PISTON FOR AN INTERNAL COMBUSTION ENGINE

(75) Inventor: Rainer Scharp, Vaihingen (DE)

(73) Assignee: Mahle GmbH, Stuttgart (DE)

( * ) Notice: Subject to any disclaimer, the term of this patent is extended or adjusted under 35 U.S.C. 154(b) by 280 days.

(21) Appl. No.: 11/630,218

(22) PCT Filed: Jun. 20, 2005

(86) PCT No.: PCT/DE2005/001098

§ 371 (c)(1),
(2), (4) Date: Feb. 16, 2007

(87) PCT Pub. No.: WO2005/124137

PCT Pub. Date: Dec. 29, 2005

(65) Prior Publication Data

US 2008/0060514 A1 Mar. 13, 2008

(30) Foreign Application Priority Data

Jun. 22, 2004 (DE) ....................... 10 2004 030 218

(51) Int. Cl.
*F16J 1/04* (2006.01)
*F01B 31/08* (2006.01)

(52) U.S. Cl. .............................. 92/221; 92/186; 92/255

(58) Field of Classification Search ................... 92/186, 92/220, 221, 255
See application file for complete search history.

(56) References Cited

U.S. PATENT DOCUMENTS

| | | | | |
|---|---|---|---|---|
| 1,311,124 A | | 7/1919 | Holmes | |
| 4,114,519 A | * | 9/1978 | Speaight | 92/186 |

FOREIGN PATENT DOCUMENTS

| | | | |
|---|---|---|---|
| DE | 22 12 922 | A1 | 9/1973 |
| DE | 28 21 506 | | 11/1979 |
| DE | 32 49 290 | T1 | 1/1984 |
| DE | 33 19 864 | C1 | 8/1984 |
| GB | 204 524 | A | 10/1923 |
| GB | 1 467 644 | | 12/1973 |
| JP | 60 240853 | A | 11/1985 |
| JP | 63 235648 | A | 9/1988 |
| JP | 11 247713 | A | 9/1999 |
| JP | 11 294258 | A | 10/1999 |
| SU | 958 681 | A1 | 9/1982 |
| WO | WO 83/02300 | | 7/1983 |
| WO | WO 96/06272 | A1 | 2/1996 |

* cited by examiner

*Primary Examiner*—Michael Leslie
(74) *Attorney, Agent, or Firm*—Collard & Roe, P.C.

(57) ABSTRACT

The invention relates to an assembled piston (1) for an internal combustion engine, said piston consisting of an upper part (4) provided with a combustion cavity (8), and a lower part (5) that is screwed to the upper part (4) by means of a screw (6) which is arranged coaxially to the piston axis (31). Said screw (6) is embodied as a set screw comprising a hexagon socket (6') on the inner side of the piston and a head (6") on the bottom side of the piston, the head (6") forming part of the bottom of the combustion cavity (8) and being flush therewith (8) in the screwed state.

2 Claims, 1 Drawing Sheet

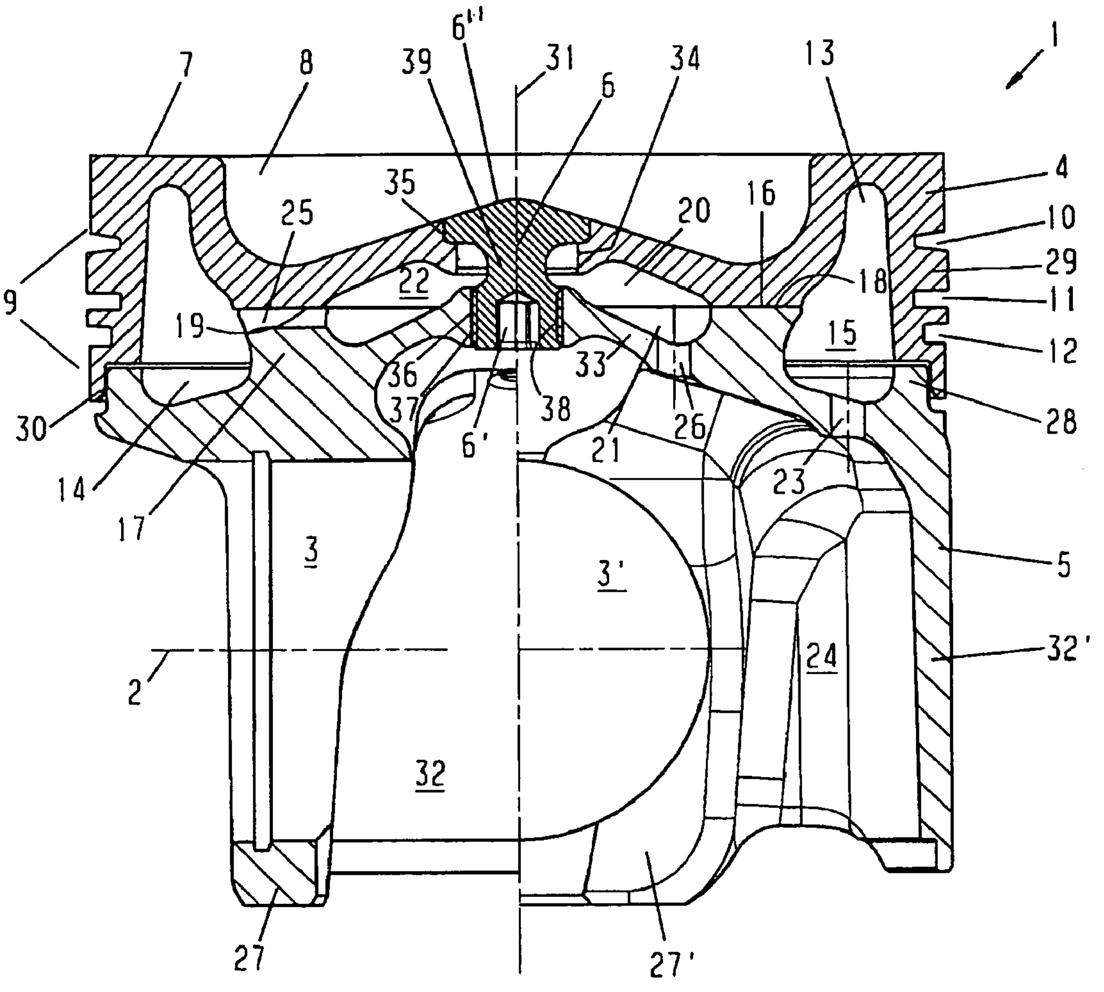
1
2
3
3'
4
5
6
6'
6''
7
8
9
10
11
12
13
14
15
16
17
18
19
20
21
22
23
24
25
26
27
27'
28
29
30
31
32
32'
33
34
35
36
37
38
39

COMPOSITE PISTON FOR AN INTERNAL COMBUSTION ENGINE

CROSS REFERENCE TO RELATED APPLICATIONS

Applicant claims priority under 35 U.S.C. §119 of German Application No. 10 2004 030 218.9 filed Jun. 22, 2004. Applicant also claims priority under 35 U.S.C. §365 of PCT/DE2005/001098 filed Jun. 20, 2005. The international application under PCT article 21(2) was not published in English.

The invention relates to a composite piston for an internal combustion engine, in accordance with the preamble of claim 1.

Composite pistons, which consist of an upper part onto which a lower part is screwed by means of a hexagonal head screw, are generally known from the state of the art and are described, for example, in the publication DE 32 49 290 T1. In this connection, the screw head of the hexagonal head screw usually lies on the piston inside, and this brings with it the necessity of providing the upper part with a dead-end bore having an inside thread, so that the upper part and the lower part can be screwed together with one another. This has the disadvantage that the space requirement for the dead-end bore as well as the screw head is relatively great, so that the compression height of the piston also has a relatively great value, and therefore the total piston has a relatively great total axial length.

Proceeding from this, the invention is based on the problem of avoiding the stated disadvantages of the state of the art and of creating a composite piston having the lowest possible compression height and the lowest possible total axial length.

This problem is solved with the characteristics contained in the characterizing part of the main claim, whereby the additional advantage is obtained that the hexagonal socket screw used according to the invention has a relatively great radial thread diameter, thereby achieving a reduction in the thread pitch and with it an improvement in the strength of the screw connection. Furthermore, this results in an increase in the size of the bearing thread surface, contributing to a further improvement in the strength of the screw connection, since in this way, the risk that the thread flanks both of the screw and of the threaded bore that accommodates this screw will shear off is reduced.

A practical embodiment of the invention is the object of the dependent claim, whereby the lower piston part has a region that can be elastically deformed, in the manner of a disk spring, into which the thread for the hexagonal socket screw is worked, so that in this way, a bias is exerted on the hexagonal socket screw, which contributes to a further improvement in the strength of the screw connection.

An exemplary embodiment of the invention will be described below, using a drawing. This shows a composite piston consisting of an upper part and a lower part, in a sectional diagram consisting of two halves, which shows two longitudinal sections of the piston, offset by 90°.

The FIGURE shows a composite piston 1 in a sectional diagram, the left half of which shows a section through the piston 1 along a longitudinal axis 2 of a pin bore 3, and the right half of which shows a section through the piston 1 offset by 90° relative to the former. The piston 1 consists of an upper part 4 and a lower part 5, which are connected with one another by means of a threaded pin 6 disposed in the center, having a hexagonal socket 6' and a smooth head 6" on the side facing away from the hexagonal socket 6', in such a manner that the hexagonal socket 6' of the threaded pin 6 comes to lie on the piston inside. In this connection, the head 6" of the threaded pin 6 has a greater radial diameter than the outside thread 38. Between the head 6" and the outside thread 38, the threaded pin 6 has an expansion region 39 having a radial diameter that is reduced relative to the outside thread 38.

The upper part 4 and the lower part 5 of the piston 1 are preferably produced from forged steel. It is also possible, however, to produce the upper part 4 from steel and the lower part 5 from aluminum, or to produce the upper part 4 from forged aluminum and the lower part from cast aluminum.

The cylindrically shaped upper part 4 forms the piston crown 7, into which a combustion bowl 8 having rotation symmetry is worked. The mantle surface of the upper part 4, which lies radially on the outside, is configured as a ring belt 9 that has three ring grooves 10, 11, and 12 for accommodating piston rings, not shown in the FIGURE. The underside of the upper part 4, facing away from the piston crown 7, has a circumferential recess 13 radially on the outside, which forms a ring-shaped, outer cooling channel 15, together with a corresponding recess 14 of the lower part 5, on the piston crown side, which channel is delimited radially on the outside by a ring wall 29 formed onto the piston crown 7.

Radially on the inside, the outer cooling channel 15 is delimited partly by a ring flange 16 disposed on the underside of the upper part 4, and partly by a ring rib 17 disposed on the top of the lower part 5, whereby the upper part 4 and the lower part 5 of the piston 1 rest on one another by way of the ring flange 16 and the ring rib 17. In this connection, the ring flange 16 has a first contact surfaces 18 and the ring rib 17 has a second contact surface 19, by way of which contact surfaces 18, 19 of the ring flange 16 and the ring rib 17 stand in contact with one another.

Radially within the ring flange 16, the upper part 4 is provided, on its underside, with another circumferential recess 20, which forms an inner, ring-shaped cooling channel 22 together with a corresponding other recess 21 formed into the top of the lower part 5. In this connection, the outer cooling channel 15 is connected with the piston interior 24 by way of an oil run-in opening 23, and with the inner cooling channel 22 by way of an oil channel 25. The inner cooling channel 22 is connected with the piston interior 24 by way of an oil run-off opening 26. To cool the piston 1, oil is injected into the outer cooling channel 15 by way of an oil run-in opening not shown in the FIGURE; after some time, it gets into the inner cooling channel 22 by way of the oil channel 25, and runs back into the piston interior 24 by way of the oil run-off openings 23 and 26.

The lower part 5 of the piston 1 consists of two pin bosses 27, 27' that lie opposite one another and are trapezoid in section, each having a pin bore 3, 3', respectively, which are disposed at such a distance from one another that the upper part of a piston rod (not shown in the FIGURE) finds room between them. Furthermore, the lower part 5 has skirt elements 32, 32' that connect the pin bosses 27, 27' with one another. On the piston crown side, the lower part 5 has a circumferential collar 28, rectangular in section, radially on the outside, which collar fits into a recess 30 disposed radially on the inside in a face of the ring wall 29 that faces away from the piston crown, so that during assembly of the piston 1, the lower part 5 is guided by way of the collar 28 and the recess 30, and centered relative to the upper part 4.

On the surface of the lower part 5 on the piston crown side, the recess 14 follows the collar 28, radially on the inside, which recess forms the outer cooling channel 15 together with the recess 13 of the upper part 4, followed by the ring rib 17 and the other recess 21, which forms the inner cooling channel 22 together with the other recess 20 of the upper part 4. In this connection, the recess 21 is worked so far into the lower piston part 5 that a thin-walled region 33 is formed between piston interior 24 and recess 21, which region is configured elastically, in the manner of a disk spring.

Coaxial to the axis 31 of the piston 1, a continuous bore 34 is made in the piston crown 7, having a diameter that is slightly greater than the diameter of the outside thread 38 of the threaded pin 6. The bore 34 has a circumferential recess 35 disposed on the piston crown side, having a radial diameter that is greater, by a slight dimension of tolerance, than the radial diameter of the head 6" of the threaded pin 6, and the cross-section of which corresponds to the cross-section of the head 6", to such an extent that when the upper part 4 is screwed together with the lower part 5, the recess 35 can serve to accommodate the head 6" of the threaded pin 6.

A passage bore 36 having an inside thread 37 is worked into the top of the lower part 5, i.e. into the elastically resilient region 33, which thread is configured in such a manner that the threaded pin 6 can be screwed into the passage bore 36 by way of its outside thread 38.

To screw them together, the upper part 4 is first set onto the lower part 5 in such a manner that the upper and lower part of the piston 1 are disposed in a certain position relative to one another. Subsequently, the threaded pin 6 is introduced into the bore 34 of the upper part 4 from the top, and screwed tightly into the passage bore 36 provided with the inside thread 37, by means of a hexagonal wrench. The deformation of the region 33 that occurs in this connection, in the manner of a disk spring, on both sides of the passage bore 36, increases the bias that acts on the threaded pin 6, and thereby results in an improvement of the strength of the screw connection.

Another improvement in the strength of the screw connection also results from the fact that the outside thread 38 of the threaded pin 6 has a greater axial diameter, because of its design, than a hexagonal head screw having a screw head and a screw shaft that is usually used in this connection. With the number of windings per screw length remaining the same, an increase in the radial thread diameter results in a reduction in the thread pitch. Since the strength of a screw connection is generally all the greater, the lower the pitch of a thread, this results in a further improvement in the strength of the screw connection according to the invention.

Furthermore, an increase in the size of the radial thread diameter also means an increase in the size of the bearing thread surfaces, both of the screw and of the threaded bore that accommodates the screw. In this way, the risk that the threaded surfaces will shear off under greater stress on the piston is reduced, making it possible to avoid greater piston and engine damage in this connection.

REFERENCE SYMBOL LIST

1 piston
2 longitudinal axis
3, 3' pin bore
4 upper part
5 lower part
6 screw; threaded pin having a
6' hexagonal socket and a
6" head on the side facing away from the hexagonal socket 6'
7 piston crown
8 combustion bowl
9 ring belt
10, 11, 12 ring groove
13, 14 recess
15 outer cooling channel
16 ring flange
17 ring rib
18 first contact surface
19 second contact surface
20, 21 recess
22 inner cooling channel
23 oil run-off opening
24 piston interior
25 oil channel
26 oil run-off opening
27, 27' pin boss
28 collar
29 ring wall
30 recess
31 axis of the piston 1
32, 32' skirt element
33 region between the piston interior 24 and the recess 21
34 bore
35 recess
36 passage bore
37 inside thread
38 outside thread of the threaded pin 6
39 expansion region of the threaded pin 6

The invention claimed is:

1. A composite piston for an internal combustion engine comprising:

an upper part forming a piston crown with a combustion bowl, the combustion bowl having a recess disposed on an underside facing away from the piston crown, and circumferential with rotation symmetry relative to a longitudinal piston axis, a lower part that is screwed together with the upper part using a screw disposed coaxial to the piston axis;

two pin bosses disposed on an underside of the lower part at a distance from one another, each pin boss having a pin bore;

skirt elements that connect the pin bosses with one another; and a recess disposed on a top of the lower part and circumferential with rotation symmetry relative to the longitudinal piston axis; said recess forming an inner cooling channel together with the recess of the upper part, wherein a continuous bore having a circumferential recess on a piston crown side is worked into the upper part coaxial to the piston axis, said circumferential recess having a greater radial diameter than a diameter of the continuous bore, wherein a passage bore with an inside thread is worked into the lower part, coaxial to the piston axis, a radial diameter of said passage bore being less than the diameter of the continuous bore, wherein the screw is configured as a threaded pin having an outside thread identical to an inside thread of the passage bore, having a hexagonal socket on a piston inside, and having a head with a shape that is complementary to the recess of the continuous bore, on the piston crown side, so that the head forms part of a bottom of the combustion bowl and ends flush with the bottom of the combustion bowl when the top and bottom parts are screwed together, and wherein the threaded pin has an expansion region between the head and the outside thread, said expansion region having a radial diameter that is smaller than a diameter of said outside thread.

2. The composite piston according to claim 1, wherein the recess in the lower piston part is worked into the lower piston part so far that a thin-walled region is formed between a piston interior and the recess, which region can be deformed in the manner of a disk spring, and contains the passage bore with the inside thread.

* * * * *